United States Patent [19]

Hoffman et al.

[11] Patent Number: 4,835,424
[45] Date of Patent: May 30, 1989

[54] PLATEN LAMINATED IN MUTUALLY PERPENDICULAR DIRECTION FOR USE WITH LINEAR MOTORS AND THE LIKE

[75] Inventors: Brian D. Hoffman, Somerville, N.J.; Steven Pollack, Washington Crossing, Pa.

[73] Assignee: Megamation Incorporated, Lawrenceville, N.J.

[21] Appl. No.: 28,795

[22] Filed: Mar. 23, 1987

[51] Int. Cl.$^4$ .............................................. H02K 41/00
[52] U.S. Cl. ........................................ 310/12; 318/135
[58] Field of Search ............................. 310/12, 13, 14; 318/135

[56] References Cited

U.S. PATENT DOCUMENTS

| Re. 27,289 | 2/1972 | Sawyer | 318/135 |
| 4,010,299 | 3/1977 | Hershey, Jr. et al. | 206/459 |
| 4,712,027 | 12/1987 | Karidis | 310/12 |

FOREIGN PATENT DOCUMENTS

| 2923293 | 12/1979 | Fed. Rep. of Germany | 310/12 |
| 1439664 | 6/1976 | United Kingdom | 310/12 |

Primary Examiner—Patrick R. Salce
Assistant Examiner—Judson H. Jones
Attorney, Agent, or Firm—Louis Weinstein

[57] ABSTRACT

A laminated platen for use with linear motors and the like having a laminated substructure comprised of ferromagnetic plates interspersed with insulating plates. Spaced parallel grooves are formed in the subsurface lamination in which a transverse lamination structure of alternating ferromagnetic and insulator plates are arranged to significantly reduce eddy currents in mutually perpendicular directions. A grid-like pattern is machined into the operating surface and cooperates with electromagnets in the linear motor to affect movement of linear motor along said operating surface in mutually perpendicular directions. Plural linear motors may be operated upon a common surface.

10 Claims, 2 Drawing Sheets

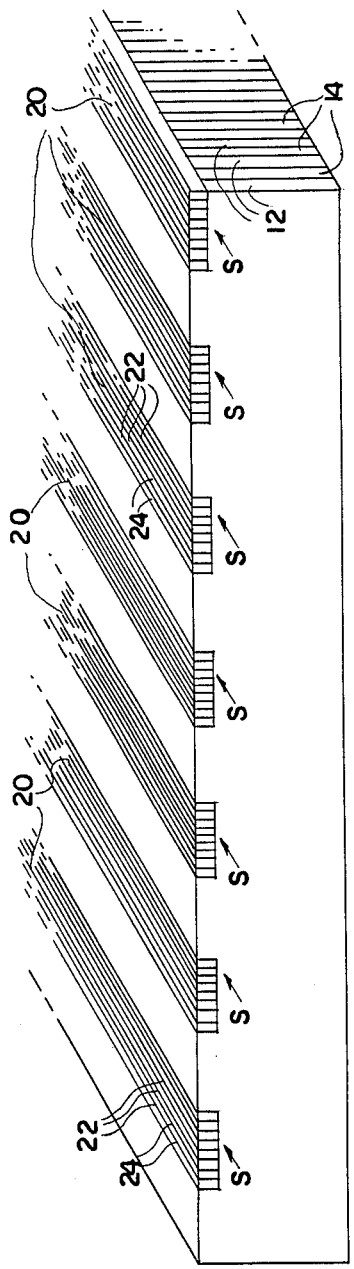
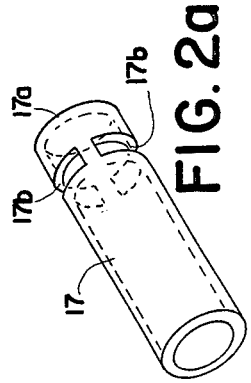
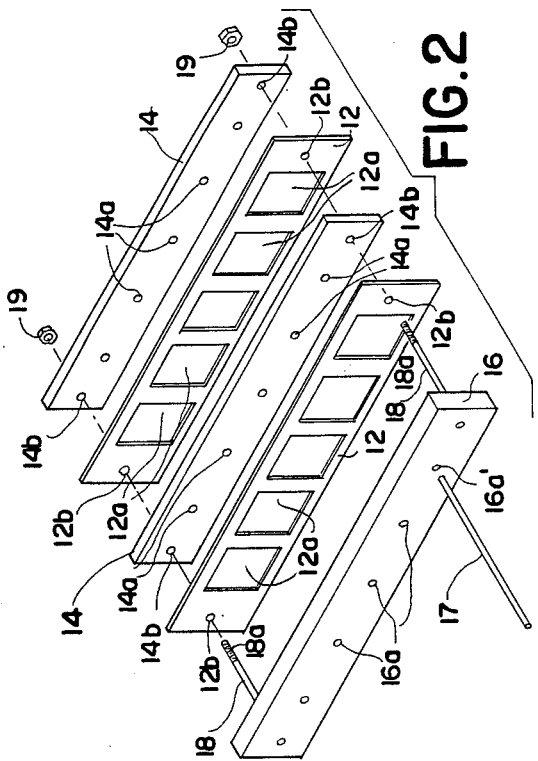
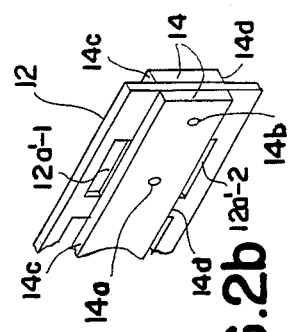

PLATEN LAMINATED IN MUTUALLY PERPENDICULAR DIRECTION FOR USE WITH LINEAR MOTORS AND THE LIKE

FIELD OF THE INVENTION

The present invention relates to laminated ferromagnetic structures, and more particularly to such structures for use in conjunction with linear motors in which the structures are laminated in mutually perpendicular directions to reduce eddy currents in both of said directions.

BACKGROUND OF THE INVENTION

Laminated stators have been used for decades to improve the performance of electromagnetic devices such as motors. The elimination or significant reduction of eddy currents through the use of insulating laminations yields significant performance gained in devices having such laminated designs. One-dimensional linear motors are becoming more popular as a drive source for machinery requiring linear motion. The linear motors are typically provided with laminated stators to improve performance. A special class of linear motors permits motion in two orthogonal directions across a planar stator (i.e. platen). Systems of this type have not been designed with laminated platens because of the difficulties in eliminating eddy currents while maintain flux paths in two orthogonal directions.

BRIEF DESCRIPTION OF THE INVENTION

The present invention provides a novel laminated platen design and method for manufacture, which design is based on the merging of two laminants into a single platen and which provides flux paths in two orthogonal directions while eliminating eddy current circulation.

The present invention includes a substrate laminate comprised of ferromagnetic and insulator plates arranged in alternating fashion. The major surface thereof is machined to provide elongated slots which extend in the direction perpendicular to the planes of the plates making up the substrate laminate. Each of said elongated channels is fitted with a transverse laminate comprised of alternating ferromagnetic and insulator plates preferably arranged so that the outside plates are both insulator plates. The transverse laminations are preferably epoxied into position. The working surface is then machined to form a grid-like pattern of grooves which is filled with a suitable insulating material to provide a smooth operating surface. The grid-like pattern cooperates with electromagnets in the linear motor to effect movement of the linear motor in mutually perpendicular directions along the working surface. The size and spacing of the grooves in the grid-like pattern determine the resolution of linear motor movement.

A method is disclosed for producing the laminated platen in which the insulator plates determine the spacing between adjacent ferromagnetic plates. Each insulator plate is preferably provided with a plurality of openings having at least one dimension extending beyond the width of the adjacent ferromagnetic plates to assure that sufficient adhesive has been introduced into said openings by means of an elongated hollow tube for dispensing adhesive into each opening in a sequential fashion.

The transverse laminations are preferably cut from the initially produced substrate laminate to conserve both material costs and fabrication costs.

OBJECTS OF THE INVENTION AND BRIEF DESCRIPTION OF THE FIGURES

It is therefore one object of the present invention to provide a novel laminated platen for use with linear motors and the like and having laminations in mutually perpendicular directions.

Another object of the present invention is to provide a novel method for forming a laminated structure having mutually perpendicular laminations for reducing eddy currents in said mutually perpendicular directions.

Still another object of the present inventin is to provide a novel method for producing laminated platens for use with linear motors and the like in which insulator members interspersed with ferromagnetic members have openings therein filled in a sequential fashion with a suitable adhesive for adhering the plates making up the laminate to one another and to assure adequate introduction of suitable adhesive material while preventing the adhesive material from affecting the spacing of the plates making up the lamination.

Still another object of the present invention is to provide a novel method for producing a platen for use with linear motors, said platen having laminations in mutually perpendicular directions wherein the laminations are joined by introducing adhesive into sequential openings provided in insulator plates making up the laminate structure by means of elongated hollow tubular members, the openings in said insulator plates having at least one dimension which is greater than the width of adjacent ferromagnetic plates to permit the release of air captured in the openings and thereby assure that the openings are completely filled with adhesive while preventing the adhesive from altering the spacing between ferromagnetic plates.

The above, as well as other objects of the present invention, will become apparent when reading the accompanying description and drawing in which:

FIG. 1 is a perspective view showing a laminated platen structure designed in accordance with the principles of the present invention.

FIG. 2 shows an exploded perspective view of the elements utilized to produce the substrate laminate.

FIG. 2a is a perspective view showing one end of the tubular adhesive injector member of FIG. 2 shown in greater detail.

FIG. 2b is a perspective view showing a portion of the laminate structure of FIG. 2 in the assembled condition to facilitate an understanding of the assembly steps.

DETAILED DESCRIPTION OF THE INVENTION

Figure 3:
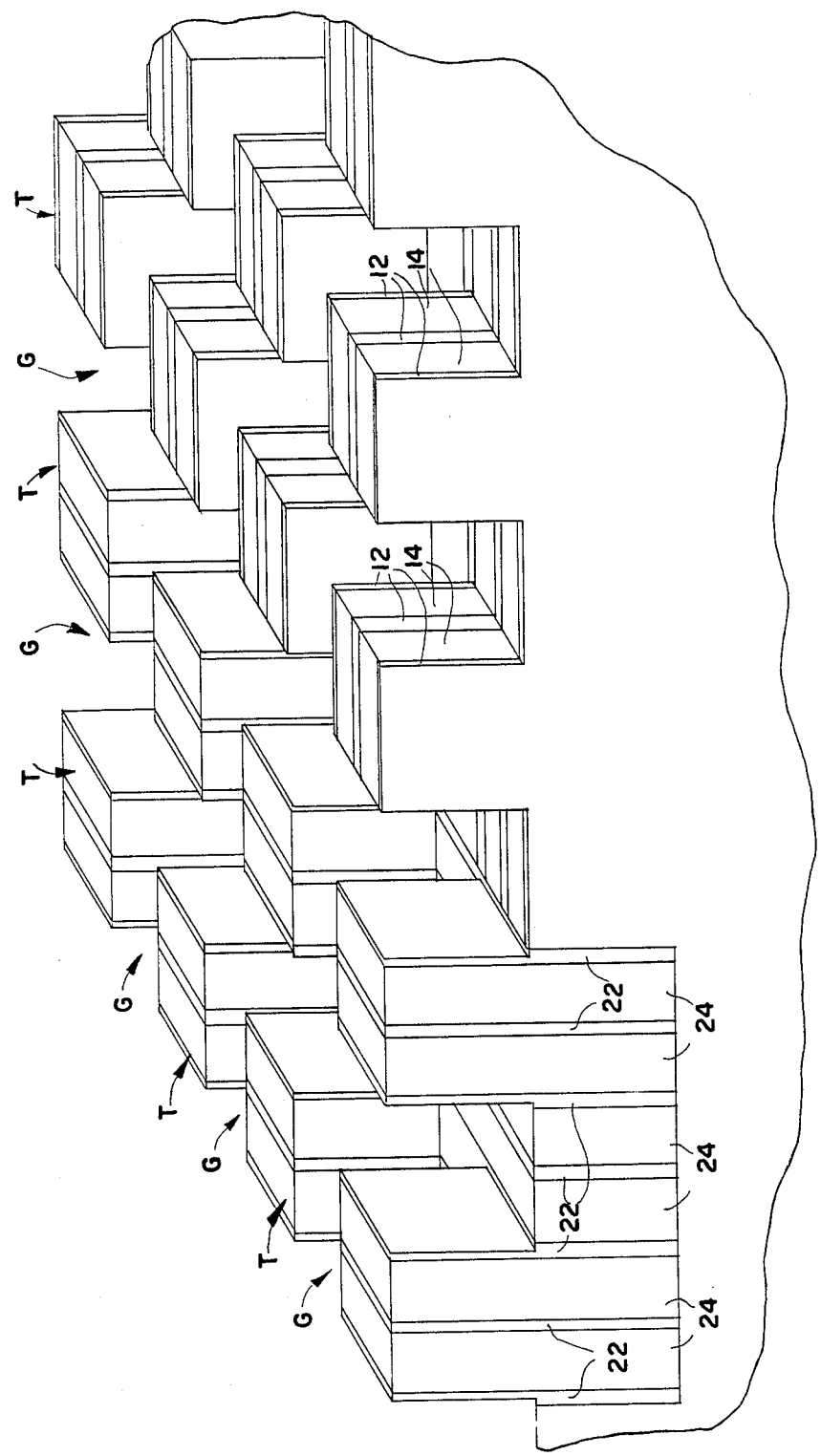
FIG. 3 is an enlarged perspective view showing a portion of the laminated structure of FIG. 1 and which is useful in providing a better understanding of the invention.

Before going into a detailed description of the present invention, a brief description of the manner of use of the device and a statement of the problem will be presented.

Two dimensional stepping motors are utilized for providing movement in mutually perpendicular directions and comprise two main elements, namely a moving member ("forcer") and a fixed member ("platen").

In operation, the forcer is magnetically propelled along the working surface of the platen. One typical two-dimensional forcer is the dual axis X-Y motor produced by Xynetics Products of Santa Clara, California. The forcer is magnetically propelled along the platen by means of selectively controlling the power provided to a plurality of electromagnets within the forcer. The electromagnets magnetize themselves to a grid array machined into the working surface of the platen. The forcer further incorporates permanent magnets which maintain an uninterrupted attraction between the platen and the forcer to maintain the forcer in close proximity to the working surface of the platen. Either an air bearing or ball bearing system respectively provide either a frictionless or low friction operation of the forcer upon the platen.

The movement of the magnetic forcer along the steel platen causes eddy currents to be generated within the platen. The eddy currents are proportional to the forcer's velocity and generate resistance to motion in the direction of travel in the forcer. The resistance to travel reduces the forcer's performance in terms of both peak velocity and acceleration. As forcer velocities increase, the net force available for acceleration is reduced.

It is well known to provide electric motors with laminated stators to reduce the effects of eddy currents on motor performance. Typically, however, such motors are generally of the type having a rotating shaft which rotates in a single plane vector. Such "one-dimensional" motion allows the motor designer to create a lamination stack which eliminates circulating eddy currents (normal to the rotor's magnetic fields) while still providing adequate flux paths between the rotor magnets. Laminated platens have also been provided for use with one-dimensional linear motors and generally result in doubling of both peak acceleration and velocity. To date, however, there are no platens which eliminate eddy currents and yet allow two-dimensional motion.

In the case of a two-dimensional motor, it is important to eliminate circular paths for eddy currents in the plane of a platen. However, flux paths between magnetic elements in two orthogonal directions parallel to the plane of the platen must be provided.

The solution to the problem achieved by the present invention is the provision of a laminated platen which promotes flux paths in two orthogonal directions parallel to the plane of the platen while eliminating the circular path for eddy currents in the plane of the platen.

FIG. 1 shows a two-directional laminate platen structure 10 which is constructed of ferromagnetic plates 14 and insulator plates 12 arranged in alternating interspersed fashion. The plates are held together by a suitable adhesive preferably using the technique employed in FIG. 2 as will be more fully described. The assembled ferromagnetic and insulator plates 14 and 12 are machined or otherwise formed to provide elongated substantially U-shaped slots S, which slots receive transverse laminate structures 20 comprised of insulator plates 22 and ferromagnetic plates 24 arranged in an interspersed fashion similar to the insulator 14 and ferromagnetic 12 plates forming the substrate laminate 10 but differing in the sense that these plates are of significantly reduced height compared with plates 12 and 14.

FIG. 2 shows one technique for assembly of the alternating steel 12 and insulating 14 sheets. As can be seen from the figure, the insulator plates 12 have a plurality of openings which may be stamped or otherwise formed therein and identified as 12a. The height of the openings 12a is greater than the height of the steel plates 14 (measured in the vertical direction). Each of the steel plates 14 is provided with a plurality of preferably circular-shaped openings 14a arranged at spaced intervals along each plate, each aligned to coincide with one of the insulator openings 12a. The insulator openings allow for the receipt of adhesive, such as an epoxy or cyanoacrylate to bond the steel plates to one another. The insulator plates serve to maintain accurate (plus or minus 0.0001 inch) spacing between the steel plates and the structure does not have to rely upon the thickness of the adhesive to establish the spacing. In addition, the accuracy is selected so that the system has high repeatability for positioning the linear motors whereby the distance between any plate and a reference point lies within a cumulative tolerance of no greater than 0.001 inch. It is preferred that an assembly fixture is employed to assemble the entire lamination stack before injecting adhesive. The assembly fixture may, for example, be comprised of a first assembly member 16 with a pair of rods 18, 18 extending therethrough and extending through openings 12b, 12b in each of the insulator plates 12, as well as the end openings 14b, 14b of the steel plates 14. The opposite end member of the fixture may be a second fixture member (not shown) or one of the steel plates 14. The entire assembly is firmly pressed together with the steel and insulator plates in intimate engagement by tightening nuts 19, 19 which threadedly engage the threaded portions 18a, 18a of elongated rods 18, 18.

The openings 14a, as well as the openings 16a in the assembly fixture 16, allow for insertion of an adhesive injector 17 which is extended through the openings in the assembled lamination stack to sequentially fill the hollow region defined by the opening 12a in each insulator plate 12 and the steel plates 14, 14 on opposite sides thereof.

The adhesive injector 17 is a hollow tubular member, a portion of which is shown in FIG. 2a in greater detail. The right-hand end of tube 17 is sealed at 17a and annular-shaped slots 17b, 17 are provided in the wall of tube 17b. Tube 17 is moved into the opening 16a', for example, and is moved in the axial direction to align annular-shaped slots 17b with the first opening 12a' in the first plate 12 adjacent to the assembly fixture member 16. With the adhesive injector 17 aligned in this manner, adhesive is dispensed in a radial direction and is introduced into the hollow tubular injector 17. Since end 17a is sealed, adhesive is caused to move in the outward radial direction through slot 17b in order to fill the region defined by opening 12a' and the plates on opposite sides thereof. As the adhesive is introduced into the hollow region defined by opening 12a', air contained therein is vented through the upper and lower portions 12a'-1 and 12a'-2 of opening 12a' which portions extend above and below the upper and lower surfaces of adjacent ferromagnetic plates 14, 14 as shown in FIG. 2b. Eventually, when the hollow region defined by opening 12a' is filled, epoxy passes out of the top and bottom portions 12a'-1 and 12a'-2 of opening 12a' providing a positive indication that the opening is suitably filled with epoxy (i.e. adhesive material).

The injector tube 17 is then axially moved to the opening in the next insulator plate. Each of the openings are thus filled in a sequential fashion. If desired, all of the openings 12a within the same insulator plate may be simultaneously filled by simultaneous operation of injector tubes introduced into each of the five openings 12a. If desired, the injector tubes may begin to introduce adhesive into the left-hand-most insulator plate and move incrementally toward the right-hand direction or, alternatively, the injector tubes may be extended all the way through the laminate assembly so that the ejector slot 17b is aligned with the opening in the right-hand-most insulator plate and the injector tube is thereafter drawn toward the left in incremental fashion to fill each of the openings of the insulator plates. Using the latter method, the injector tube avoids coming into contact with the adhesive in each of the filled openings in the insulator plates. Linear motors may be employed as the means for stepping the adhesive tube from one opening 12a to the next.

As another possible alternative, the injector tube may be provided with more than one slot for ejecting the epoxy into two or more openings in adjacent insulator plates in a simultaneous fashion.

When the adhesive has been properly introduced in the manner described hereinabove, at least the portions of the insulator plates extending beyond the upper surfaces 14c of the steel plates are removed to provide a smooth planar surface. The planar surface is then machined or otherwise formed to provide the slots S for receipt of the transverse laminate structures 20. The transverse laminate structures 20 can be manufactured in the same way as the substrate laminates. Since the transverse laminates are preferably only 0.075 inches thick, many such laminates can be sliced from a substrate laminate. Each sliced transverse laminate is then precision ground to guarantee a proper fit within the associated slot S provided in the substrate laminate so that no air gaps are provided between the engaging surfaces of the substrate laminate and the transverse laminate, as shown best in FIG. 3.

Once the transverse laminates 20 are ground and the substrate laminate has been ground to accept the transverse laminate, the transverse laminate is pressed and glued in place. It is important that no adhesive be allowed to separate those portions of the top surfaces of the plates 12 and 14 which form the base of each slot S from the bottom surfaces of the plates 22 and 24 which comprise the transverse laminate although adhesive is permitted to be introduced between the exposed sides of the plates in the transverse laminate which comprise the outer plates of the transverse laminate and the engaging surfaces of the plates 12 and 14 forming the sidewalls of the slots S.

After insertion of the transverse laminate structures 20 into associated slots 10 of the substrate laminate 10, the upper surface of the resulting laminate is ground flush to form a planar surface having an accuracy sufficient to maintain the consistency and smooth operation of the air bearing. This planar surface is then machined to form grooves for creating the magnetization teeth, said grooves G forming a grid-like pattern, as well as defining the teeth T.

It is important that the teeth T must be created relative to the laminations as shown best in FIG. 3 and the grooves G must be accurately positioned with respect to each other. Inaccuracies in the machining process will have an adverse effect on the acceleration limits and positioning accuracy of the forcer member utilized with the dual laminated platen.

After creation of the magnetization teeth T by formation of the grooves G, the entire grooved surfaces forming the grid-like pattern is filed with epoxy. The epoxy is then ground flush with the top of the magnetization teeth to form a smooth, planar surface for receipt of one or more forcers.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed:

1. A platen for use with a first linear motor comprising a laminated substrate comprising a plurality of elongated ferromagnetic plates and insulator plates interspersed between said ferromagnetic plates;
    adjacent edges of said ferromagnetic and insulator plates collectively defining a working surface;
    a plurality of elongated grooves being provided in said working surface, said grooves being arranged in spaced parallel fashion and being traverse to the planes of said plates;
    a plurality of elongated transverse laminates each arranged in one of said grooves and each comprising at least one ferromagnetic plate sandwiched between insulator plates.

2. The plate of claim 1 wherein the working surface has a plurality of mutually perpendicular sets of linear grooves extending through both said first laminated substrate and said transverse laminates and forming a grid-like pattern in said working surface.

3. The platen of claim 2 wherein said grid-like pattern of grooves are filled with an insulator material, said insulator material forming the grid-like pattern of said grid-like pattern of grooves.

4. The platen of claim 1 wherein said working surface is polished to provide a smooth planar surface to facilitate sliding movement of the linear motor along said surface, which is collectively formed by said insulator material, said insulator plates and said ferromagnetic plates.

5. The platen assembly of claim 1 wherein edge portions of the transverse ferromagnetic plates engage the edge portions of the ferromagnetic plates in said substrate assembly to provide a good magnetic path therebetween.

6. The platen assembly of claim 1 wherein the insulator plates arranged between ferromagnetic plates are provided with at least one opening;
    said opening being filled with adhesive means for adhering the ferromagnetic plates on opposite sides of said opening.

7. The platen of claim 6 wherein at least one of the ferromagnetic plates arranged at one end of the laminated structure is provided with a small opening for introducing the adhesive means into the region defined by the opening in said insulator plate and the adjacent ferromagnetic plates.

8. The platen of claim 6 wherein said region is filled with said adhesive means by a hollow tubular member inserted into the small opening in said end ferromagnetic plate and said adhesive means is introduced into said region through said tubular member.

9. A platen assembly for use with linear motors comprising a laminated substructure having a working surface of alternating ferromagnetic and insulator surface portions each being of narrow elongated rectangular shape and being parallel to the elongated direction of the substructure; and
    a plurality of narrow elongated transverse structures each set in elongated channels cut into said elongated rectangular surface portions at right angles to the longitudinal axes of said laminated substrate surface portions, each of said transverse structures providing transverse working surface portions in said working surface of parallel alternating ferromagnetic and insulator surface portions similar to and aligned transverse to the ferromagnetic and insulator surface portions of said working surface.

10. The platen assembly of claim 1 wherein the insulator plates and ferromagnetic plates are each provided with an opening; the openings in said insulator plates being considerably larger than the openings in said ferromagnetic plates whereby adhesive is introduced through the small openings in the ferromagnetic plates to fill the entire region defined by the opening in each insulator plate to adhere the adjacent ferromagnetic plates to one another.

* * * * *